(12) United States Patent
Emrich et al.

(10) Patent No.: US 12,415,601 B2
(45) Date of Patent: Sep. 16, 2025

(54) ELECTRICALLY ISOLATED AUXILIARY FLIGHT CONTROLLERS FOR ROTORCRAFT

(71) Applicant: Textron Innovations Inc., Providence, RI (US)

(72) Inventors: Joshua Andrew Emrich, Grapevine, TX (US); David Outhwaite, Saint Sauveur (CA); Christopher Dunlop, Westmount (CA); Mitchell Lichocki, Dollard-des-Ormeaux (CA)

(73) Assignee: Textron Innovations Inc., Providence, RI (US)

( * ) Notice: Subject to any disclaimer, the term of this patent is extended or adjusted under 35 U.S.C. 154(b) by 471 days.

(21) Appl. No.: 18/071,439

(22) Filed: Nov. 29, 2022

(65) Prior Publication Data

US 2024/0174359 A1 May 30, 2024

(51) Int. Cl.
| | | |
|---|---|---|
| *B64D 1/00* | (2006.01) | |
| *B64D 1/22* | (2006.01) | |
| *H01H 9/16* | (2006.01) | |
| *H01H 47/00* | (2006.01) | |
| *B64C 27/04* | (2006.01) | |
| *B66D 1/40* | (2006.01) | |

(52) U.S. Cl.
CPC .............. *B64D 1/22* (2013.01); *H01H 9/161* (2013.01); *H01H 47/001* (2013.01); *B64C 27/04* (2013.01); *B66D 1/40* (2013.01)

(58) Field of Classification Search
CPC ........ B64D 1/22; H01H 9/161; H01H 47/001; B64C 27/04; B66D 1/40
See application file for complete search history.

(56) References Cited

U.S. PATENT DOCUMENTS

| | | | | |
|---|---|---|---|---|
| 7,296,753 | B1 * | 11/2007 | Zucker | H03K 17/78 |
| | | | | 235/462.48 |
| 7,310,573 | B2 | 12/2007 | Stickling | |
| 8,829,479 | B2 * | 9/2014 | Abernathy | H04L 12/40032 |
| | | | | 244/1 A |
| 9,804,217 | B2 * | 10/2017 | Salvatge | H04B 10/40 |
| 10,073,466 | B2 * | 9/2018 | Yang | G01S 19/39 |
| 11,055,931 | B2 * | 7/2021 | Huynh | G09G 5/00 |
| 2003/0231444 | A1 * | 12/2003 | Kitahara | H03K 17/0824 |
| | | | | 361/54 |
| 2005/0145699 | A1 * | 7/2005 | Zucker | H03K 17/691 |
| | | | | 235/462.48 |
| 2005/0228549 | A1 * | 10/2005 | Stickling | H04B 15/00 |
| | | | | 701/3 |

(Continued)

FOREIGN PATENT DOCUMENTS

CN 209023130 U * 6/2019 ........... B64C 39/024

*Primary Examiner* — Peter D Nolan
*Assistant Examiner* — Peter Y Ning
(74) *Attorney, Agent, or Firm* — Lawrence Youst PLLC

(57) ABSTRACT

A rotorcraft includes a fuselage, a flight control computer, an auxiliary flight controller having one or more flight control inputs in the noncockpit section of the fuselage and a relay interposed between the flight control computer and the auxiliary flight controller such that the auxiliary flight controller is in data communication with the flight control computer via the relay. The relay prevents electromagnetic interference affecting the auxiliary flight controller from affecting the flight control computer.

20 Claims, 7 Drawing Sheets

(56) References Cited

U.S. PATENT DOCUMENTS

| | | | |
|---|---|---|---|
| 2010/0010794 A1* | 1/2010 | Sweers | G06F 30/20 |
| | | | 702/182 |
| 2011/0174960 A1* | 7/2011 | Weaver | B82Y 30/00 |
| | | | 977/932 |
| 2020/0092052 A1* | 3/2020 | MacAfee | H04L 1/08 |
| 2021/0215748 A1* | 7/2021 | Hwang | H01P 1/161 |
| 2022/0371446 A1* | 11/2022 | Culpin | B64C 13/50 |
| 2023/0008941 A1* | 1/2023 | Morrison | H04B 10/40 |
| 2023/0064503 A1* | 3/2023 | Chai | H02H 1/003 |

* cited by examiner

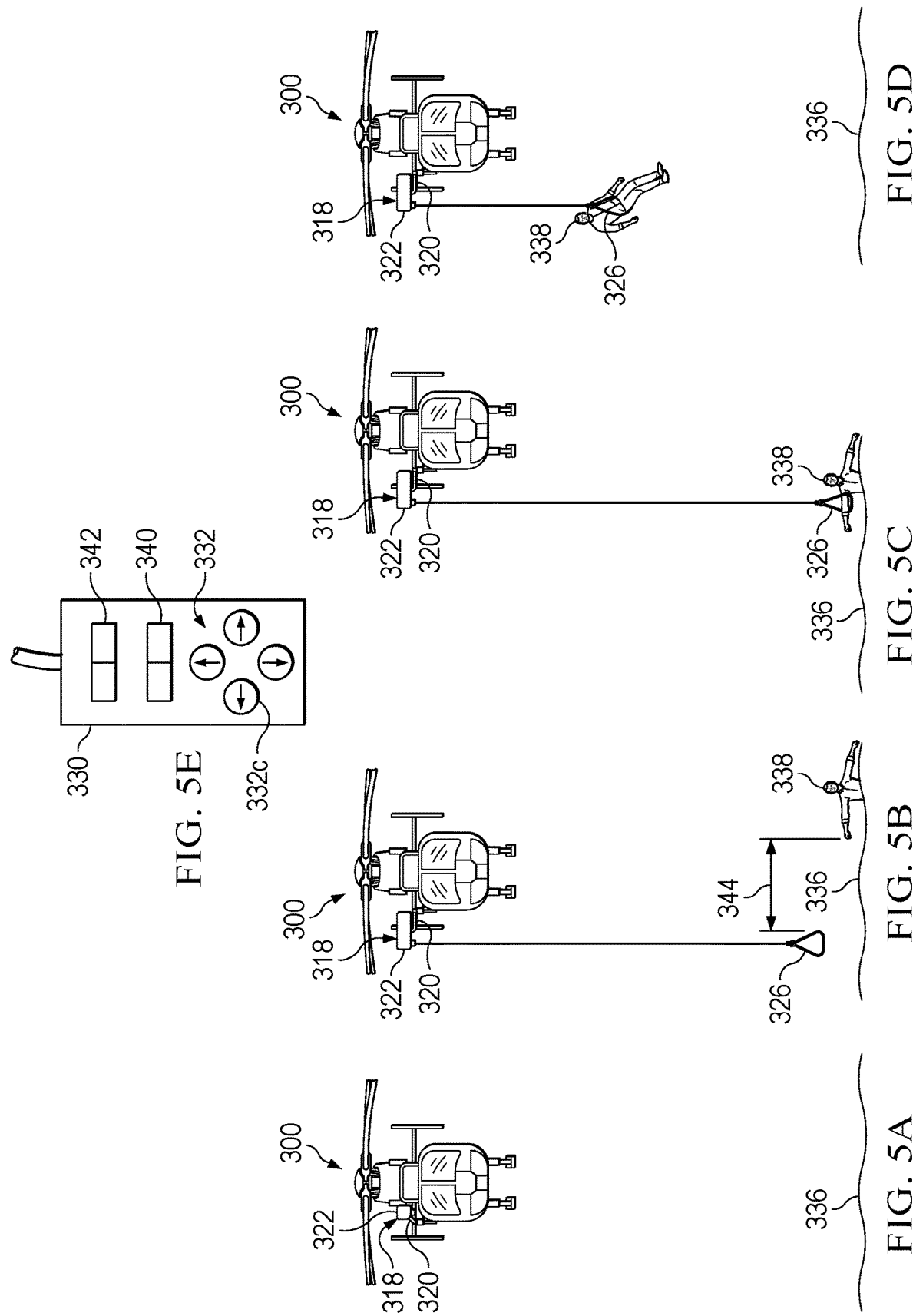

ELECTRICALLY ISOLATED AUXILIARY FLIGHT CONTROLLERS FOR ROTORCRAFT

TECHNICAL FIELD OF THE DISCLOSURE

The present disclosure relates, in general, to electrically isolated systems in aircraft and, in particular, to electrically isolating auxiliary flight controllers from certified systems in the aircraft using relays to enable noncockpit flight control of the aircraft without compromising the certification status of the certified aircraft systems.

BACKGROUND

In modern aircraft, mechanical flight control devices such as cables, chains, cranks and other mechanisms have been augmented or replaced by electrical control systems. While electrical circuitry enhances the accuracy, reliability and safety of modern aircraft, critical onboard electrical systems may be susceptible to electromagnetic interference. For example, electrical circuitry may fail to operate as intended when exposed to high levels of electromagnetic radiation. Thus, aviation authorities such as the Federal Aviation Administration (FAA) and the European Union Aviation Safety Agency (EASA) require some aircraft to be certified by undergoing electromagnetic interference testing such as high intensity radiated field (HIRF) testing and/or lightning testing to verify and ensure safety during flight.

While critical aircraft systems such as flight control computers are routinely certified to ensure compliance with HIRF testing requirements, additional electrical systems may sometimes be added or retrofitted to the certified systems of the aircraft. Such post-certification changes may result in compromises to system-level or aircraft-level compliance to HIRF and/or lightning requirements. For example, retrofitting a flight control system with an auxiliary flight control such as a hoist operator's controller may increase the vulnerability of the aircraft's critical flight control computer to electromagnetic interference such as lightning. In such a scenario, a lightning strike near or around the hoist system may cause high voltage transients that can potentially be transferred to the flight control computer.

If critical systems such as a flight control computer are retrofitted with wiring to an electrical system in a region of the aircraft not previously considered during certification testing, system-level and/or aircraft-level retesting is often required to recertify the affected systems. Electromagnetic interference certification retesting, however, can be costly, risky and time-consuming. Previous attempts to avoid certification retesting have involved the addition of transient voltage suppression diodes, or transorbs, in a previously certified electrical region of the aircraft. The addition of such devices, however, may necessitate the added costs of system-level and/or aircraft-level retesting to reacquire regulatory compliance. Accordingly, a need has arisen for electrical isolation systems and devices that electrically isolate, or separate, aircraft systems from one another to prevent electromagnetic propagation from one system to another and thereby avoid the need for system-level and aircraft-level electromagnetic interference retesting.

SUMMARY

In a first aspect, the present disclosure is directed to a rotorcraft including a fuselage, a flight control computer, an auxiliary flight controller having one or more flight control inputs in the noncockpit section of the fuselage and a relay interposed between the flight control computer and the auxiliary flight controller such that the auxiliary flight controller is in data communication with the flight control computer via the relay. The relay prevents electromagnetic interference affecting the auxiliary flight controller from affecting or propagating to the flight control computer.

In some embodiments, the flight control computer may be a system certified as meeting certain regulatory electrical requirements and the auxiliary flight controller may be an electrically uncertified system. In certain embodiments, the relay may be located in a certified electrical region including the certified system. In some embodiments, the flight control computer may include a time out controller and may be configured to cease implementing commands from the relay in response to the time out controller detecting a closed state of the relay exceeding a predetermined time period. In certain embodiments, the auxiliary flight controller may include a flight control pendant in the noncockpit section of the fuselage and the flight control pendant may include the flight control input(s). In some embodiments, the auxiliary flight controller may include a wireless receiver and a wireless flight control pendant. In such embodiments, the wireless flight control pendant may include the flight control input(s) and the wireless receiver may be in data communication with the flight control computer via the relay, the wireless receiver wirelessly receiving flight control commands from the wireless flight control pendant. In certain embodiments, the wireless flight control pendant may be located outside the fuselage of the rotorcraft. In some embodiments, flight control commands originating from the flight control input(s) may be transmitted to the flight control computer via the relay. In certain embodiments, the auxiliary flight controller may be a retrofitted system added to the rotorcraft. In some embodiments, the relay may include a plurality of relays and the one or more flight control inputs may include a plurality of flight control inputs, each relay transmitting data from a respective one of the flight control inputs to the flight control computer. In certain embodiments, the flight control inputs may include one or more of forward, backward, leftward, rightward, upward, downward, roll and yaw flight control inputs.

In some embodiments, the relay may be a mechanical relay, a solid state relay or an optoisolator. In certain embodiments, the relay may include a light emitting diode, a photoreceptor and a dielectric, the light emitting diode transmitting photons to the photoreceptor via the dielectric in response to a flight control command originating from the flight control input(s). In some embodiments, the relay may be switchable between an open state and a closed state and the rotorcraft may include a power supply configured to provide an electrical signal to the flight control computer via the relay in the closed state. In certain embodiments, the rotorcraft may include a second relay interposed between the flight control computer and the auxiliary flight controller and commands originating from the flight control computer may be transmitted to the auxiliary flight controller via the second relay. In some embodiments, the rotorcraft may include an auxiliary flight controller disconnect input in the cockpit section of the fuselage in data communication with the flight control computer, the flight control computer configured to cease implementing flight control commands from the auxiliary flight controller in response to a command from the auxiliary flight controller disconnect input.

In a second aspect, the present disclosure is directed to a rotorcraft having a hover mode including a fuselage, a flight control computer and a hoist system including an auxiliary flight controller having flight control inputs configured to transmit flight control commands in the hover mode of the rotorcraft, the flight control inputs located in the noncockpit section of the fuselage. The rotorcraft also includes a plurality of solid state relays interposed between the flight control computer and the auxiliary flight controller such that the auxiliary flight controller is in data communication with the flight control computer via the solid state relays, each solid state relay transmitting flight control commands from a respective one of the flight control inputs to the flight control computer. The solid state relays prevent electromagnetic interference affecting the hoist system from affecting the flight control computer.

In some embodiments, the rotorcraft may be a helicopter. In certain embodiments, the hoist system may include a boom coupled to the exterior of the fuselage and a winch coupled to the distal end of the boom. In some embodiments, the auxiliary flight controller may include a flight control pendant including the flight control inputs operable by a hoist operator in the noncockpit section of the fuselage to position the rotorcraft relative to a surface target.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 5A-5E are schematic illustrations of a rotorcraft having an electrically isolated hoist system in a sequential flight operating scenario in accordance with embodiments of the present disclosure;

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1A:
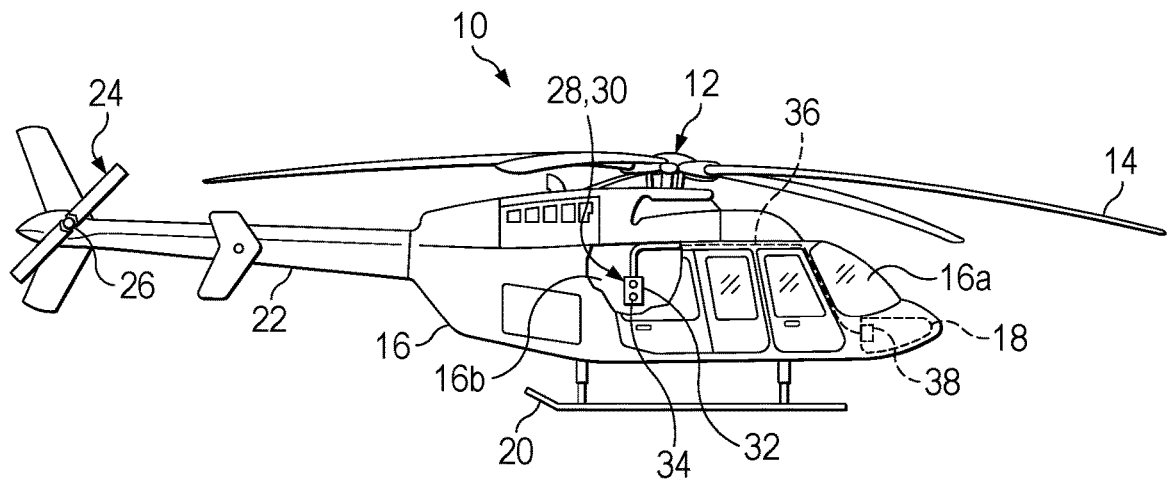
FIGS. 1A-1B are schematic illustrations of a rotorcraft having electrically isolated aircraft systems in accordance with embodiments of the present disclosure.
Figure 1B:
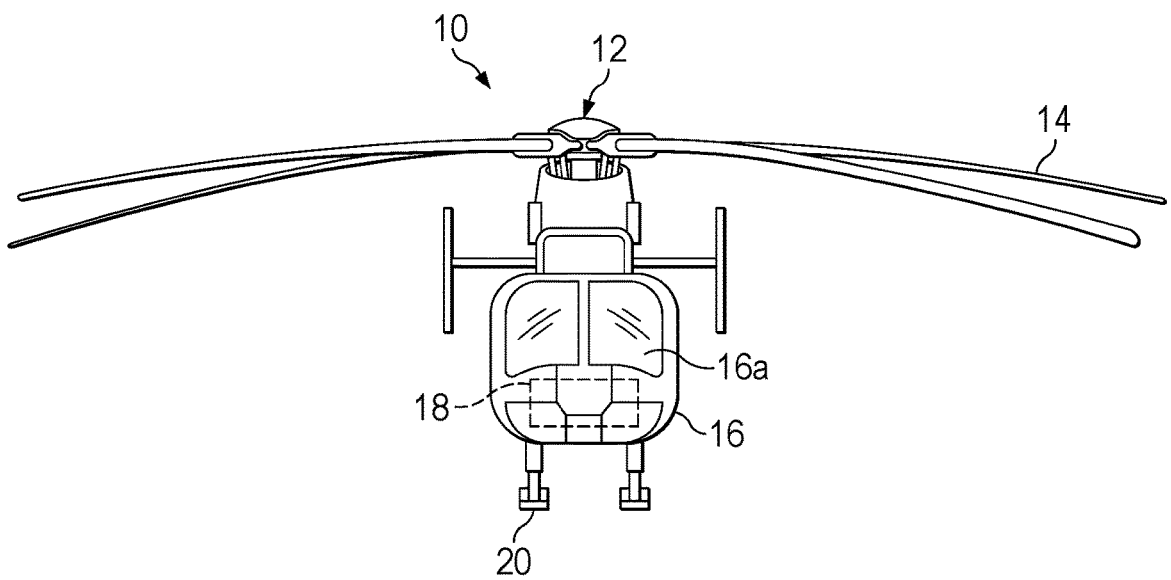

Referring to FIGS. 1A-1B in the drawings, a rotorcraft depicted as a helicopter including an electrical isolation system is schematically illustrated and generally designated 10. Rotorcraft 10 includes a rotor hub assembly 12, which includes a plurality of rotor blade assemblies 14. Rotor hub assembly 12 is rotatable relative to a fuselage 16 of rotorcraft 10. Fuselage 16 includes a cockpit section 16a in which pilot(s) control the primary flight operations of rotorcraft 10. Fuselage 16 also includes a noncockpit section 16b for cargo or other occupants of rotorcraft 10. Various operations of rotorcraft 10 including primary flight operations are controlled and managed by a flight control computer 18. The pitch of rotor blade assemblies 14 can be collectively and/or cyclically manipulated to selectively control direction, thrust and lift of rotorcraft 10. A landing gear system 20 including skids provides ground support for rotorcraft 10. A tailboom 22 extends from fuselage 16. A tail rotor 24 includes a tail rotor hub assembly 26 that is rotatably coupled to the aft portion of tailboom 22.

In the illustrated embodiment, flight control computer 18 is a critical system and has undergone HIRF testing to comply with electrical regulatory requirements for aircraft promulgated by aviation authorities such as the FAA and EASA. Such testing ensures that rotorcraft 10 can withstand prescribed levels of electromagnetic interference such as lightning strikes during operation. Flight control computer 18 may therefore be considered to be a certified system within rotorcraft 10. Rotorcraft 10 also includes an uncertified system 28, at least a portion of which has not been tested for compliance with the electrical regulatory requirements for which flight control computer 18 has been certified. In the illustrated embodiment, uncertified system 28 is an auxiliary flight controller 30, although in other embodiments uncertified system 28 may be any noncritical or critical electrical system that has been added or retrofitted onto rotorcraft 10 including any wiring between uncertified system 28 and flight control computer 18. Auxiliary flight controller 30 enables noncockpit flight control of rotorcraft 10 and includes a flight control pendant 32 having one or more flight control inputs 34 in noncockpit section 16b of fuselage 16.

Auxiliary flight controller 30 communicates with flight control computer 18 via one or more wires 36. In certain embodiments, some portions of auxiliary flight controller 30 are certified and other portions of auxiliary flight controller 30 such as wires 36 are uncertified, the addition of wires 36 causing auxiliary flight controller 30 to be considered an uncertified system. Because auxiliary flight controller 30 is an uncertified system and/or has been added to rotorcraft 10 after system-level or aircraft-level certification with respect to HIRF and/or lightning requirements, the presence or addition of auxiliary flight controller 30 may increase the vulnerability of the critical systems of rotorcraft 10 such as flight control computer 18 to electromagnetic interference such as lightning, thereby compromising the certification status of rotorcraft 10 and flight control computer 18. For example, a lightning strike near or around auxiliary flight controller 30 may cause high voltage transients that can potentially be transferred to flight control computer 18, a critical system of rotorcraft 10. Previously, in order for rotorcraft 10 to remain in compliance with regulatory electromagnetic interference standards, system-level and/or aircraft-level HIRF and lightning retesting for flight control computer 18 and/or rotorcraft 10 was required, which can be costly, time-consuming and uncertain. To avoid the need for such retesting, auxiliary flight controller 30 has been electrically isolated from flight control computer 18 using one or more relays, or switches, 38 located at flight control computer 18, a certified electrical region of rotorcraft 10. Auxiliary flight controller 30 is in data communication with flight control computer 18 solely via relay 38, which prevents voltage transients and electromagnetic interference such as lightning strikes that affect auxiliary flight controller 30 from being transferred to the more critical flight control computer 18. Because the addition of relay 38 does not substantially alter the wiring or electrical vulnerability of the previously certified flight control computer 18, the need to retest flight control computer 18 and/or rotorcraft 10 for compliance with regulatory electromagnetic interference standards may be avoided.

It should be appreciated that rotorcraft 10 is merely illustrative of a variety of aircraft that can implement the embodiments disclosed herein. Indeed, the electrical isolation systems of the illustrative embodiments may be implemented on any aircraft. Other aircraft implementations can include hybrid aircraft, tiltwing aircraft, tiltrotor aircraft, quad tiltrotor aircraft, unmanned aircraft, gyrocopters, propeller-driven airplanes, compound helicopters, jets, drones and the like. As such, those skilled in the art will recognize that the electrical isolation systems of the illustrative embodiments can be integrated into a variety of aircraft configurations. It should be appreciated that even though aircraft are particularly well-suited to implement the embodiments of the present disclosure, non-aircraft vehicles and devices can also implement the embodiments.

Figure 2A:
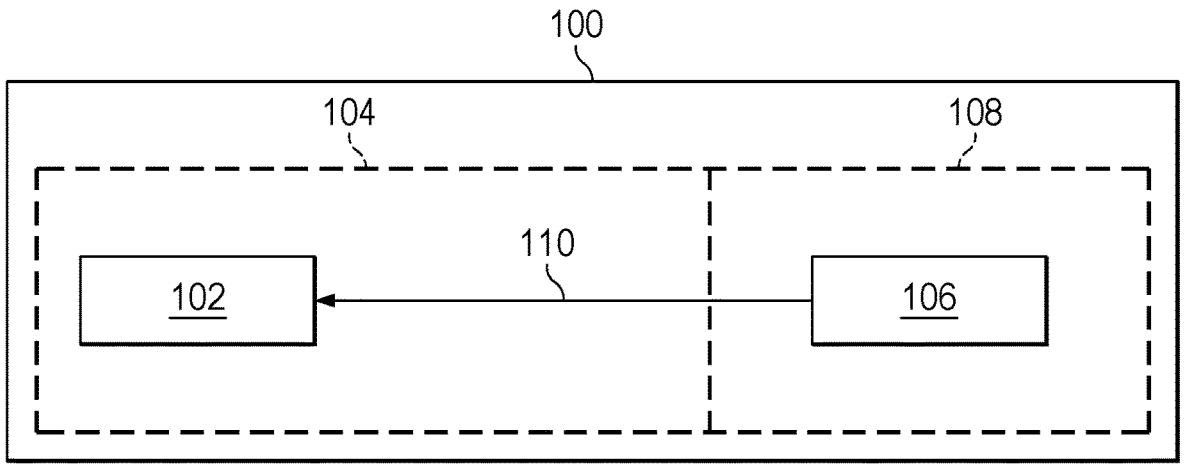
FIGS. 2A-2B are schematic illustrations of electrically connected aircraft systems as implemented in previous aircraft.
Figure 2B:
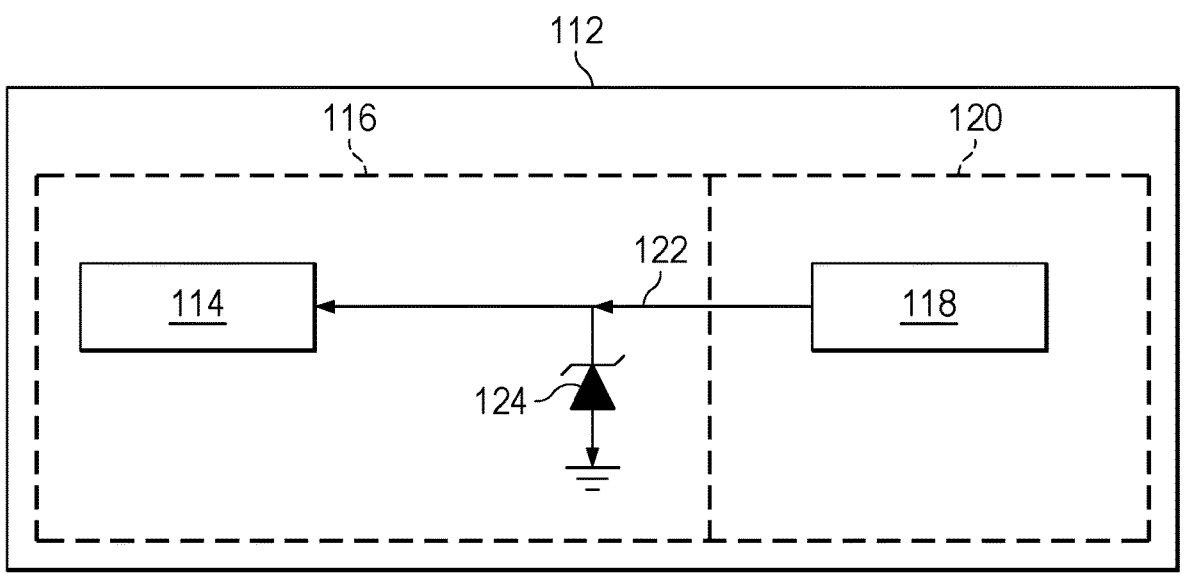

Referring to FIGS. 2A-2B in the drawings, the electrical interconnection of aircraft systems as implemented on previous aircraft is schematically illustrated. In FIG. 2A, aircraft 100 includes a critical system 102 such as a flight control computer in a region 104 of aircraft 100 that has been certified for compliance with regulatory electromagnetic interference standards. A noncritical system 106 has been added or retrofitted onto aircraft 100 in a region 108 of aircraft 100 that has not been certified for compliance with regulatory electromagnetic interference standards. Electrical wiring 110 connects noncritical and uncertified system 106 to critical and certified system 102. Because noncritical and uncertified system 106 is directly electrically connected to critical and certified system 102, electromagnetic interference such as lightning strikes affecting noncritical and uncertified system 106 may cause voltage transients to be transferred to critical and certified system 102 beyond the levels for which critical and certified system 102 has been certified, thereby necessitating retesting for aircraft 100 and/or critical and certified system 102.

In FIG. 2B, aircraft 112 includes a critical system 114 such as a flight control computer in a region 116 of aircraft 112 that has been certified for compliance with regulatory electromagnetic interference standards. A noncritical system 118 has been added or retrofitted onto aircraft 112 in a region 120 of aircraft 112 that has not been certified for compliance with regulatory electromagnetic interference standards. Electrical wiring 122 connects noncritical and uncertified system 118 to critical and certified system 114. A transient voltage suppression diode, or transorb, 124 has been inserted between systems 114, 118 to clamp voltage transients originating at uncertified region 120 from reaching or compromising certified region 116. The use of transient voltage suppression diode 124 to isolate noncritical and uncertified system 118, however, has several drawbacks. For example, in the event that transient voltage suppression diode 124 is damaged, critical and certified system 114 may be exposed to voltage transients from noncritical and uncertified system 118, and implementations in previous aircraft lack the ability to detect damage to transient voltage suppression diode 124. In addition, if no test data exists to quantify aircraft-level voltage transients in the circuit beyond transient voltage suppression diode 124, then aircraft-level testing must be repeated. System-level testing must also be repeated since the previous certification of system 114 is no longer valid due to differences in wiring and the use of transient voltage suppression diode 124 in particular. Accordingly, a need has arisen to electrically isolate newly added or retrofitted systems from existing critical and/or certified systems in aircraft to avoid the need for repeated electromagnetic interference testing.

Figure 3:
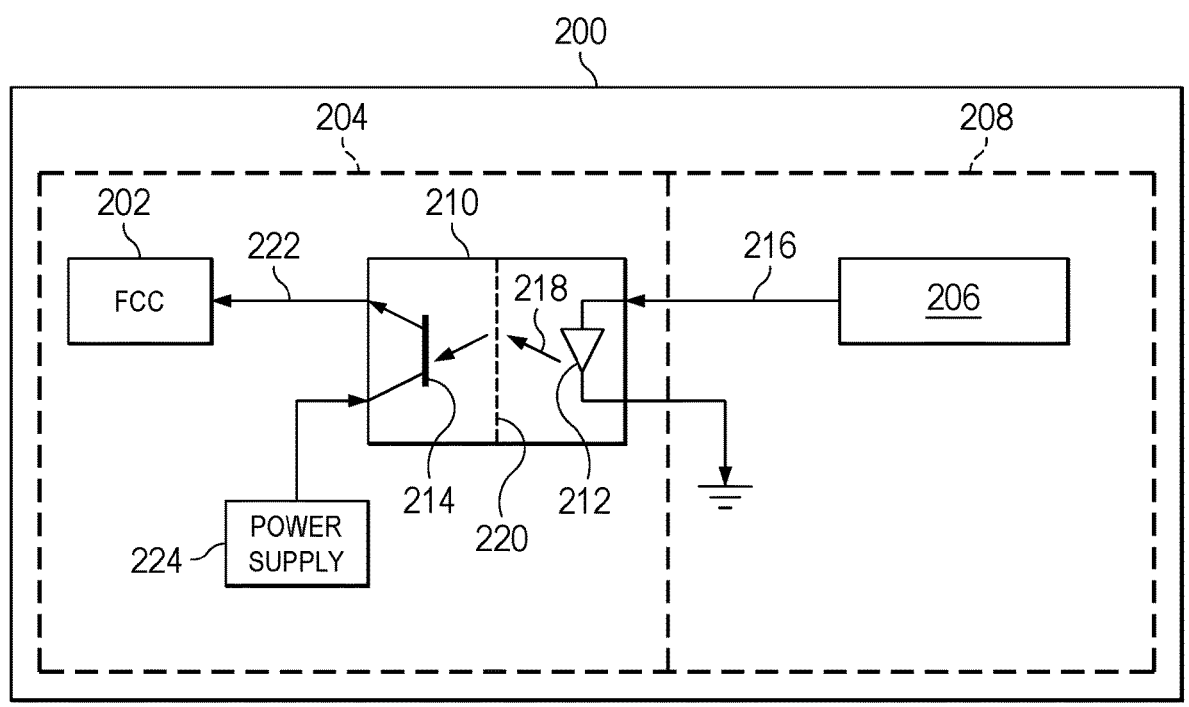
FIG. 3 is a schematic illustration of an onboard aircraft system electrically isolated from a flight control computer in an aircraft in accordance with embodiments of the present disclosure.

Referring to FIG. 3 in the drawings, an aircraft including electrically isolated systems is schematically illustrated and generally designated 200. Aircraft 200 includes flight control computer 202 in a region 204 of aircraft 200 that has been certified for compliance with regulatory electromagnetic interference standards. Flight control computer 202 is a critical system of aircraft 200. In other embodiments, certified system 202 may be a system other than a flight control computer including either a critical system or a noncritical system. Aircraft 200 also includes noncritical system 206 that has been added or retrofitted to aircraft 200 in a region 208 of aircraft 200 that has not been certified for compliance with regulatory electromagnetic interference standards. In other embodiments, system 206 may be a critical system of aircraft 200.

A solid state relay 210 is interposed in the electrical wiring between flight control computer 202 and noncritical and uncertified system 206 such that noncritical and uncertified system 206 is in data communication with flight control computer 202 via solid state relay 210. More specifically, solid state relay 210 transfers input such as commands from noncritical and uncertified system 206 to flight control computer 202 so that flight control computer 202 may perform a predetermined operation based on the input from noncritical and uncertified system 206. Solid state relay 210 is a switch that closes when input is received from noncritical and uncertified system 206 and remains open when no input is received from noncritical and uncertified system 206. Solid state relay 210 is installed in certified region 204 in which flight control computer 202 resides and for which electrical interference resilience testing has been performed.

In the illustrated embodiment, solid state relay 210 includes a light emitting diode 212 and a photoreceptor 214. When an electrical signal or command from noncritical and uncertified system 206 is received by solid state relay 210 via wire 216, light emitting diode 212 converts the electrical input signal into a light signal 218 that passes through dielectric 220. Solid state relay 210 is closed when light signal 218 is received by photoreceptor 214. When solid state relay 210 is closed, a discrete electrical signal is sent to flight control computer 202 over wire 222 from power supply 224 via the closed solid state relay 210. In some embodiments, power supply 224 may be a 28 volt power supply. In other embodiments, flight control computer 202 may instead be grounded so that an electrical signal may be passed via another source. In certain embodiments, solid state relay 210 may be or may include an optoisolator or optocoupler.

Solid state relay 210 electrically isolates noncritical and uncertified system 206 from the certified flight control computer 202 by interposing a closed optical channel between the two systems. For purposes of regulatory electrical certification, the circuitry beyond solid state relay 210, namely uncertified region 208 including system 206, has little to no relevance as long as solid state relay 210 is sufficient to protect flight control computer 202 against measured or anticipated voltage transients. Solid state relay 210 is preferably sized to protect against measured or anticipated voltage transients originating from uncertified region 208. The strength, or withstanding voltage, of dielectric 220 ensures that voltage transients below the level for which dielectric 220 is qualified will not leak through solid state relay 210 from noncritical and uncertified system 206 to flight control computer 202, thereby protecting flight control computer 202. Dielectric 220 may be qualified to withstand predetermined threshold voltage transients such as those resulting from a lightning strike or observed in previous testing. In some non-limiting examples and depending on the application, dielectric 220 may be qualified to withstand voltage transients in a range of one volt to 10,000 volts such as 200 volts, 500 volts, 1,000 volts, 5,000 volts or 10,000 volts, as well as voltage transients exceeding this range. In other embodiments, a mechanical relay may be used in lieu of or in addition to solid state relay 210. In such embodiments, the mechanical relay physically opens and closes based on input from noncritical and uncertified system 206 to allow or impede a corresponding electrical signal from power supply 224 to flight control computer 202.

Solid state relay 210 prevents electromagnetic interference such as lightning strikes that affect noncritical and uncertified system 206 from affecting flight control computer 202. The illustrative embodiments may limit critical system wiring to aircraft regions considered during previous testing to allow claims of similarity to previous certification data. In particular, because solid state relay 210 is installed in certified region 204 where flight control computer 202 has qualified wiring and where test data exists, certified region 204, which now includes solid state relay 210, may be considered to be similar enough to pre-existing wiring to avoid the need for system-level or aircraft-level retesting. The illustrative embodiments thus allow an uncertified electrical system that communicates with a critical system such as flight control computer 202 to be added or retrofitted to aircraft 200 without the burden of recertifying the aircraft. In addition, solid state relay 210 has the additional benefits of having high life expectancy, low electrical noise, low delay and no moving parts.

Figure 4A:
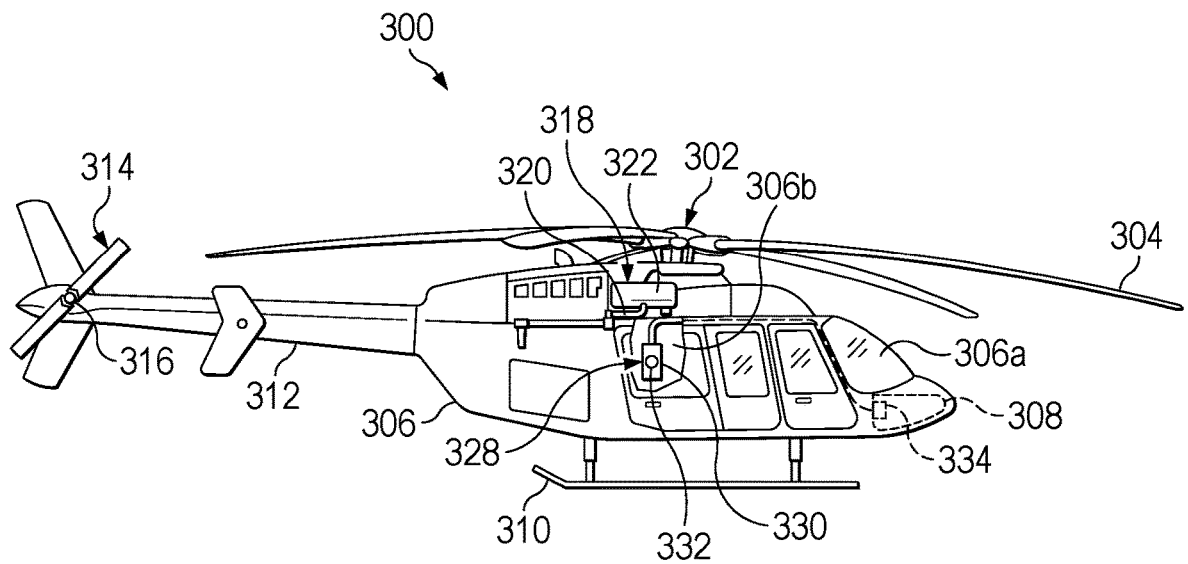
FIGS. 4A-4C are schematic illustrations of a rotorcraft having a hoist system including an auxiliary flight controller electrically isolated from a flight control computer in accordance with embodiments of the present disclosure.
Figure 4B:
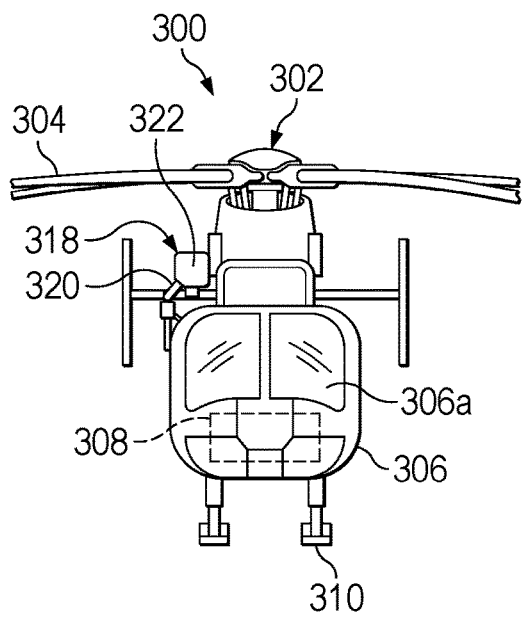
Figure 4C:
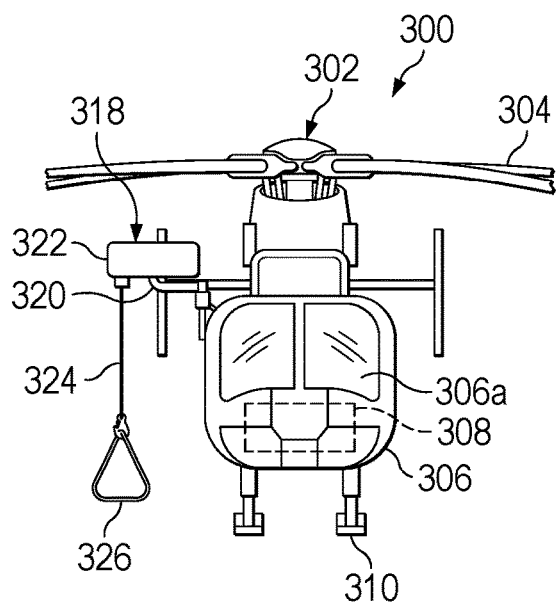

Referring to FIGS. 4A-4C in the drawings, a rotorcraft depicted as a helicopter including an electrical isolation system is schematically illustrated and generally designated 300. Rotorcraft 300 includes rotor hub assembly 302, which includes a plurality of rotor blade assemblies 304. Rotor hub assembly 302 is rotatable relative to fuselage 306 of rotorcraft 300. Fuselage 306 includes cockpit section 306a in which pilot(s) control the primary flight operations of rotorcraft 300. Fuselage 306 also includes noncockpit section 306b for cargo or other occupants of rotorcraft 300. Various operations of rotorcraft 300 including primary flight operations are controlled and managed by flight control computer 308. The pitch of rotor blade assemblies 304 can be collectively and/or cyclically manipulated to selectively control direction, thrust and lift of rotorcraft 300. A landing gear system 310 including skids provides ground support for rotorcraft 300. A tailboom 312 extends from fuselage 306. A tail rotor 314 includes a tail rotor hub assembly 316 that is rotatably coupled to the aft portion of tailboom 312.

A hoist system 318 has been added or retrofitted onto rotorcraft 300. Hoist system 318 includes a retractable boom 320 coupled to the exterior of fuselage 306 that may be retracted as shown in FIGS. 4A-4B or extended as shown in FIG. 4C. A winch 322 is coupled to the distal end of boom 320. A cable 324 and a harness 326 may be lowered from winch 322 when boom 320 is in the extended position. Hoist system 318 also includes auxiliary flight controller 328 with a flight control pendant 330. Flight control pendant 330 includes flight control inputs 332, which transmit or originate flight control commands when rotorcraft 300 is in hover mode. Flight control pendant 330 may also be used to control the operation of boom 320 and winch 322. While flight controls exist in flight control computer 308, auxiliary flight controller 328 may communicate with the existing flight controls in flight control computer 308 to allow for expanded capability. In particular, flight control pendant 330 is located in noncockpit section 306b of rotorcraft 300 so that a hoist operator is able to control the flight direction of rotorcraft 300 during a hoist operation in hover mode. Hoist system 318 and auxiliary flight controller 328 specifically is electrically isolated from flight control computer 308 using solid state relays 334 interposed between flight control computer 308 and auxiliary flight controller 328. Auxiliary flight controller 328 is in data communication with flight control computer 308 via solid state relays 334.

Referring additionally to FIGS. 5A-5E in the drawings, rotorcraft 300 is shown executing a search and rescue sequential flight operating scenario using hoist system 318. In FIG. 5A, rotorcraft 300 is in hover mode above a water surface 336 and boom 320 is retracted. In FIG. 5B, the occupant(s) of rotorcraft 300 have located the surface target of the search and rescue mission depicted as rescuee 338. Upon locating rescuee 338, boom 320 is extended using boom controls 340 on flight control pendant 330 and harness 326 is lowered from winch 322 using winch controls 342. Flight control pendant 330 is shown in FIG. 5E. Lowered harness 326 is located a distance 344 from rescuee 338, which is too distant for rescuee 338 to grab onto harness 326. The hoist operator in noncockpit section 306b of fuselage 306 has a generally clear line of sight to water surface 336 and identifies the direction and distance 344 that rotorcraft 300 must move to position harness 326 within reach of rescuee 338. The hoist operator uses flight control inputs 332 of flight control pendant 330 in noncockpit section 306b of fuselage 306 to position rotorcraft 300 closer to rescuee 338 as shown in FIG. 5C. More particularly, the hoist operator presses leftward flight control input 332c to move rotorcraft 300 in the port direction by distance 344, thus allowing rescuee 338 to grab onto harness 326. In FIG. 5D, rescuee 338 is secured by harness 326 and is being lifted to safety using winch 322. Hoist system 318 gives a hoist operator in noncockpit section 306b of fuselage 306 the ability to move rotorcraft 300 to assist with hoist operations, which may be beneficial when the pilot of rotorcraft 300 lacks the visibility or line of sight to fine tune the location of rotorcraft 300 relative to a surface target or is occupied with other critical rotorcraft operations.

Figure 6:
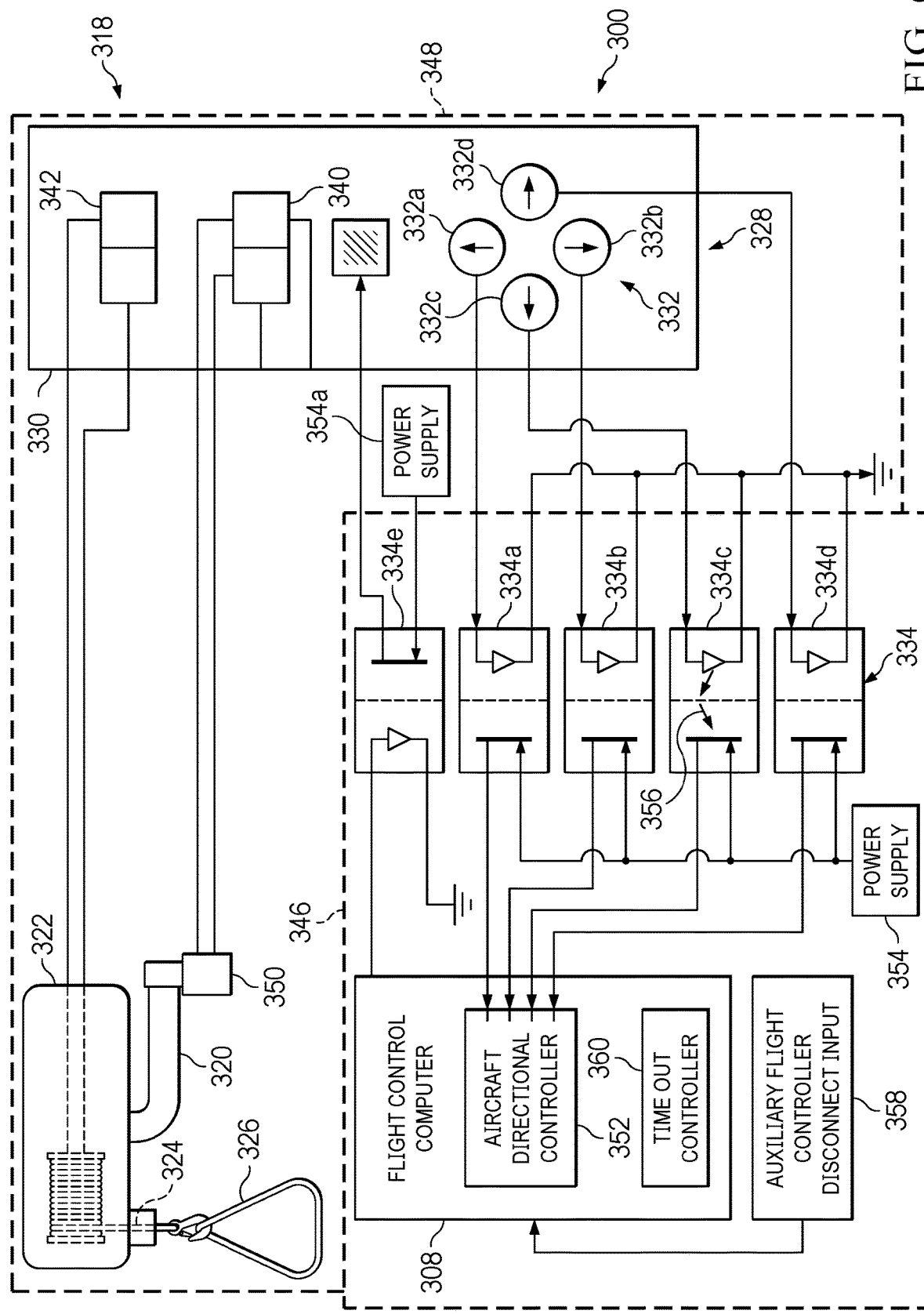
FIG. 6 is a schematic circuit diagram of a hoist system, auxiliary flight controller and flight control pendant electrically isolated from a flight control computer of an aircraft in accordance with embodiments of the present disclosure.

Referring additionally to FIG. 6 in the drawings, the interconnection between flight control computer 308 and hoist system 318 within rotorcraft 300 is schematically illustrated. Solid state relays 334 are interposed between flight control computer 308 and auxiliary flight controller 328 of hoist system 318 such that auxiliary flight controller 328 is in data communication with flight control computer 308 via solid state relays 334. Flight control computer 308 is in a region 346 of rotorcraft 300 that has been certified for compliance with regulatory electromagnetic interference standards. Flight control computer 308 is a critical system of aircraft 300. Hoist system 318 has been added or retrofitted to rotorcraft 300 in a region 348 of rotorcraft 300 that has not been certified for compliance with regulatory electromagnetic interference standards. In certain embodiments, hoist system 318 may be certified while the wires connecting hoist system 318 to flight control computer 308 cause region 348 to be uncertified. Solid state relays 334 are installed in certified region 346 of rotorcraft 300.

Flight control pendant 330 has some wires that connect to boom 320 and winch 322 and other wires that extend to solid state relays 334 to communicate data with flight control computer 308. Boom controls 340 send commands to boom actuator 350 to retract and extend boom 320 and winch controls 342 send commands to winch 322 to retract and extend cable 324 and harness 326. In some embodiments, hoist controls including boom controls 340 and winch controls 342 may reside on a separate pendant than flight control inputs 332 instead of being integrated on a single flight control pendant 330. Hoist controls as well as flight control inputs 332 may be buttons, voice activated inputs, touchscreen interface inputs or any other interface type.

Flight control commands originating from flight control inputs 332 are transmitted to flight control computer 308 via solid state relays 334, each of which have an internal configuration similar to solid state relay 210 in FIG. 3 including a light emitting diode, a photoreceptor and a dielectric therebetween. In some embodiments, all or a portion of solid state relays 334 may be optoisolators. In the illustrated embodiment, flight control inputs 332 include forward, backward, leftward and rightward flight control inputs 332a, 332b, 332c, 332d. In other embodiments, flight control inputs 332 may include more or less flight direction controls depending on the level of control desired for the operator of auxiliary flight controller 328. For example, flight control inputs 332 may include vertical flight control inputs such as upward and/or downward flight control inputs. Flight control inputs 332 may also include yaw flight control inputs and/or roll flight control inputs. Each solid state relay 334a, 334b, 334c, 334d transmits commands from a respective one of flight control inputs 332a, 332b, 332c, 332d to aircraft directional controller 352 of flight control computer 308 such that one solid state relay is assigned for each discrete signal. Specifically, solid state relay 334a transmits forward flight commands from forward flight control input 332a to flight control computer 308, solid state relay 334b transmits backward flight commands from backward flight control input 332b to flight control computer 308, solid state relay 334c transmits leftward, or port, flight commands from leftward flight control input 332c to flight control computer 308 and solid state relay 334d transmits rightward, or starboard, flight commands from rightward flight control input 332d to flight control computer 308. When a flight control command is received by one of solid state relays 334a, 334b, 334c, 334d, the light emitting diode for the engaged solid state relay emits light that is received by the corresponding photoreceptor in the engaged solid state relay, thus closing the switch that allows an electrical signal from power supply 354 to pass to a respective input of aircraft directional controller 352. For example, in the illustrated embodiment leftward flight control input 332c is being engaged. In this example, an electrical signal travels to solid state relay 334c. The light emitting diode of solid state relay 334c emits light 356 to the photoreceptor of solid state relay 334c via the dielectric therebetween. When light 356 hits the photoreceptor of solid state relay 334c, an electrical signal is sent from power supply 354 to a respective input of aircraft directional controller 352 initiating leftward movement of rotorcraft 300 during hover. A similar signal flow occurs for the other flight control inputs 332a, 332b, 332d through their respective solid state relays 334a, 334b, 334d.

Solid state relay 334e transmits a signal or command in the opposite direction as solid state relays 334a, 334b, 334c, 334d, namely from flight control computer 308 to auxiliary flight controller 328. In this case, flight control computer 308 emits an electrical signal to solid state relay 334e, whose light emitting diode emits light to the photoreceptor of solid state relay 334e via the dielectric therebetween. Once solid state relay 334e is closed, an electrical signal is sent to auxiliary flight controller 328 from power supply 354a, another power source or a ground communicating with flight control pendant 330. In one non-limiting example, flight control computer 308 may send a command via solid state relay 334e enabling or disabling auxiliary flight controller 328 to allow a pilot of rotorcraft 300 to control whether the hoist operator in noncockpit section 306b of fuselage 306 can control the flight of rotorcraft 300 during hover. Such a command may be initiated by an auxiliary flight controller disconnect input 358 in cockpit section 306a of fuselage 306 that is in data communication with flight control computer 308. In one example, auxiliary flight controller 328 may emit an audio signal such as a beep when auxiliary flight controller 328 is engaged via solid state relay 334e. In other embodiments, flight control computer 308 may cease implementing flight control commands from auxiliary flight controller 328 in response to a command from auxiliary flight controller disconnect input 358 to flight control computer 308. In yet other embodiments, auxiliary flight controller 328 may be permitted to control the flight of rotorcraft 300 only when rotorcraft 300 is in autopilot mode.

In some embodiments, flight control computer 308 includes a time out controller 360. Flight control computer 308 ceases to implement flight control commands from auxiliary flight controller 328 in response to time out controller 360 detecting a closed state of one of solid state relays 334a, 334b, 334c, 334d exceeding a predetermined time period. When one of solid state relays 334a, 334b, 334c, 334d is in a closed state for an abnormally extended time period, it is possible that the closed solid state relay is malfunctioning. Thus, to prevent auxiliary flight controller 328 from erroneously altering the direction of rotorcraft 300, time out controller 360 may disconnect or cease responding to input from a solid state relay 334a, 334b, 334c, 334d that has been closed for too long. For example, if one of solid state relays 334a, 334b, 334c, 334d is in a closed state for longer than 30 seconds, time out controller 360 may cease implementing signals coming from the affected solid state relay. Solid state relays 334a, 334b, 334c, 334d, 334e prevent electromagnetic interference such as lightning strikes affecting hoist system 318 from affecting flight control computer 308, a critical and certified system, thus avoiding the need for rotorcraft 300 or flight control computer 308 to be retested and recertified when hoist system 318 is added to rotorcraft 300. Solid state relays 334a, 334b, 334c, 334d, 334e including the dielectrics therein may be selected or qualified to handle voltage transients that are anticipated to originate from hoist system 318. For example, if test data shows that hoist system 318 is typically affected by voltage transients up to 1,000 volts, then solid state relays 334a, 334b, 334c, 334d, 334e may correspondingly be selected or qualified to handle voltage transients up to 1,000 volts.

Figure 7:
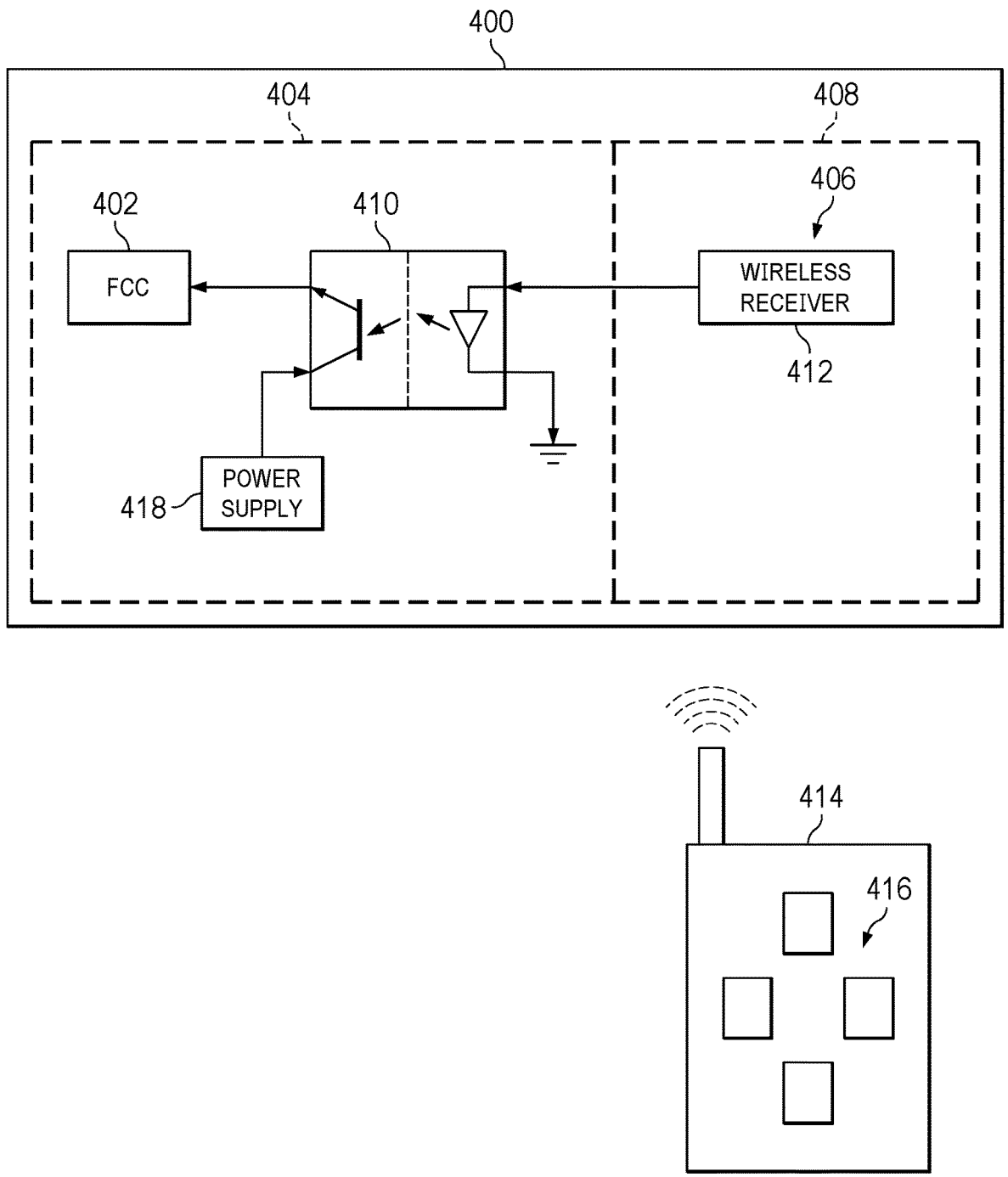
FIG. 7 is a schematic illustration of a wireless aircraft system including a wireless pendant electrically isolated from a flight control computer of an aircraft in accordance with embodiments of the present disclosure.

Referring to FIG. 7 in the drawings, an aircraft having electrically isolated systems including a wireless system is schematically illustrated and generally designated 400. Aircraft 400 includes flight control computer 402 in a region 404 of aircraft 400 that has been certified for compliance with regulatory electromagnetic interference standards. Flight control computer 402 is a critical system of aircraft 400. Aircraft 400 also includes wireless system 406 that has been added or retrofitted to aircraft 400 in a region 408 of aircraft 400 that has not been certified for compliance with regulatory electromagnetic interference standards. A solid state relay 410 such as a light-based solid state relay or an optoisolator is interposed in the electrical wiring between flight control computer 402 and wireless system 406 such that wireless system 406 is in data communication with flight control computer 402 via one or more solid state relays 410. More specifically, solid state relay 410 transfers input such as commands from wireless system 406 to flight control computer 402 so that flight control computer 402 may perform a predetermined operation based on the input from wireless system 406. In the illustrated embodiment, wireless system 406 includes a wireless receiver 412 and a wireless flight control pendant 414. Wireless receiver 412 is in data communication with flight control computer 402 via solid state relay 410. Wireless flight control pendant 414 includes flight control inputs 416. In some embodiments, wireless flight control pendant 414 may be located outside the fuselage of aircraft 400 such as on a ground surface. When wireless receiver 412 wirelessly receives a flight control command from wireless flight control pendant 414, wireless receiver 412 sends an electrical signal to solid state relay 410, which converts the electrical signal into a light signal that closes solid state relay 410, causing a corresponding electrical signal to be passed to flight control computer 402 from power supply 418. Wireless system 406 provides additional communication flexibility for added or retrofitted systems of aircraft 400, while still providing electrical isolation of such systems to avoid system-level or aircraft-level recertification. In other embodiments, wireless flight control pendant 414 may include inputs other than flight control inputs depending on the purpose of wireless system 406.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. For example, numerous combinations of the features disclosed herein will be apparent to persons skilled in the art including the combining of features described in different and diverse embodiments, implementations, contexts, applications and/ or figures. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A rotorcraft comprising:
    a fuselage including a cockpit section and a noncockpit section;
    a flight control computer;
    an auxiliary flight controller including one or more flight control inputs in the noncockpit section of the fuselage; and
    a relay interposed between the flight control computer and the auxiliary flight controller such that the auxiliary flight controller is in data communication with the flight control computer via the relay;
    wherein, the relay prevents electromagnetic interference affecting the auxiliary flight controller from affecting the flight control computer.

2. The rotorcraft as recited in claim 1 wherein the flight control computer comprises a system certified as meeting one or more regulatory electrical requirements and wherein the auxiliary flight controller comprises an electrically uncertified system.

3. The rotorcraft as recited in claim 2 wherein the relay is located in a certified electrical region including the certified system.

4. The rotorcraft as recited in claim 1 wherein the flight control computer comprises a time out controller, the flight control computer configured to cease implementing commands from the relay in response to the time out controller detecting a closed state of the relay exceeding a predetermined time period.

5. The rotorcraft as recited in claim 1 wherein the auxiliary flight controller comprises a flight control pendant in the noncockpit section of the fuselage, the flight control pendant including the one or more flight control inputs.

6. The rotorcraft as recited in claim 1 wherein the auxiliary flight controller comprises a wireless receiver and a wireless flight control pendant;
    wherein, the wireless flight control pendant includes the one or more flight control inputs; and
    wherein, the wireless receiver is in data communication with the flight control computer via the relay, the wireless receiver wirelessly receiving flight control commands from the wireless flight control pendant.

7. The rotorcraft as recited in claim 1 wherein flight control commands originating from the one or more flight control inputs are transmitted to the flight control computer via the relay.

8. The rotorcraft as recited in claim 1 wherein the auxiliary flight controller comprises a retrofitted system added to the rotorcraft.

9. The rotorcraft as recited in claim 1 wherein the relay comprises a plurality of relays and the one or more flight control inputs comprise a plurality of flight control inputs, each relay transmitting data from a respective one of the plurality of flight control inputs to the flight control computer.

10. The rotorcraft as recited in claim 9 wherein the plurality of flight control inputs include at least one of forward, backward, leftward, rightward, upward, downward, roll and yaw flight control inputs.

11. The rotorcraft as recited in claim 1 wherein the relay comprises a mechanical relay.

12. The rotorcraft as recited in claim 1 wherein the relay comprises a solid state relay.

13. The rotorcraft as recited in claim 12 wherein the solid state relay comprises an optoisolator.

14. The rotorcraft as recited in claim 12 wherein the solid state relay comprises a light emitting diode, a photoreceptor and a dielectric, the light emitting diode transmitting photons to the photoreceptor via the dielectric in response to a flight control command originating from the one or more flight control inputs.

15. The rotorcraft as recited in claim 1 wherein the relay is switchable between an open state and a closed state, the rotorcraft further comprising:
a power supply configured to provide an electrical signal to the flight control computer via the relay in the closed state.

16. The rotorcraft as recited in claim 1 further comprising a second relay interposed between the flight control computer and the auxiliary flight controller;
wherein, commands originating from the flight control computer are transmitted to the auxiliary flight controller via the second relay.

17. The rotorcraft as recited in claim 1 further comprising an auxiliary flight controller disconnect input in the cockpit section of the fuselage in data communication with the flight control computer, the flight control computer configured to cease implementing flight control commands from the auxiliary flight controller in response to a command from the auxiliary flight controller disconnect input.

18. A rotorcraft having a hover mode, the rotorcraft comprising:
a fuselage including a cockpit section and a noncockpit section;
a flight control computer;
a hoist system including an auxiliary flight controller having a plurality of flight control inputs configured to transmit flight control commands in the hover mode of the rotorcraft, the plurality of flight control inputs located in the noncockpit section of the fuselage; and
a plurality of solid state relays interposed between the flight control computer and the auxiliary flight controller such that the auxiliary flight controller is in data communication with the flight control computer via the plurality of solid state relays, each solid state relay transmitting flight control commands from a respective one of the plurality of flight control inputs to the flight control computer;
wherein, the plurality of solid state relays prevent electromagnetic interference affecting the hoist system from affecting the flight control computer.

19. The rotorcraft as recited in claim 18 wherein the hoist system comprises a boom coupled to an exterior of the fuselage and a winch coupled to a distal end of the boom.

20. The rotorcraft as recited in claim 18 wherein the auxiliary flight controller comprises a flight control pendant including the plurality of flight control inputs operable by a hoist operator in the noncockpit section of the fuselage to position the rotorcraft relative to a surface target.

\* \* \* \* \*